(12) United States Patent
Chawla et al.

(10) Patent No.: US 9,262,197 B2
(45) Date of Patent: Feb. 16, 2016

(54) SYSTEM AND METHOD FOR INPUT/OUTPUT ACCELERATION DEVICE HAVING STORAGE VIRTUAL APPLIANCE (SVA) USING ROOT OF PCI-E ENDPOINT

(71) Applicants: Gaurav Chawla, Austin, TX (US); Robert Wayne Hormuth, Cedar Park, TX (US); Shyamkumar T. Iyer, Austin, TX (US); Duk M. Kim, Cedar Park, TX (US)

(72) Inventors: Gaurav Chawla, Austin, TX (US); Robert Wayne Hormuth, Cedar Park, TX (US); Shyamkumar T. Iyer, Austin, TX (US); Duk M. Kim, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 14/333,343

(22) Filed: Jul. 16, 2014

(65) Prior Publication Data

US 2016/0019079 A1    Jan. 21, 2016

(51) Int. Cl.
*G06F 9/00* (2006.01)
*G06F 9/455* (2006.01)
*G06F 13/32* (2006.01)
*G06F 12/10* (2006.01)
*G06F 12/08* (2006.01)
*G06F 9/48* (2006.01)
*G06F 9/44* (2006.01)

(52) U.S. Cl.
CPC .......... *G06F 9/45558* (2013.01); *G06F 9/4403* (2013.01); *G06F 9/4856* (2013.01); *G06F 12/0875* (2013.01); *G06F 12/1081* (2013.01); *G06F 13/32* (2013.01); *G06F 2009/45579* (2013.01); *G06F 2212/303* (2013.01); *G06F 2212/657* (2013.01)

(58) Field of Classification Search
CPC ............................ G06F 9/45558; G06F 13/32
USPC ................................ 710/52–54; 709/221–223
See application file for complete search history.

(56) References Cited

U.S. PATENT DOCUMENTS

| | | | |
|---|---|---|---|
| 2009/0150528 A1* | 6/2009 | Tanabe et al. | 709/221 |
| 2012/0167082 A1* | 6/2012 | Kumar et al. | 718/1 |
| 2012/0271981 A1 | 10/2012 | Bayer et al. | 711/6 |
| 2014/0258577 A1* | 9/2014 | Egi | G06F 13/366 710/113 |
| 2014/0351809 A1* | 11/2014 | Chawla | G06F 9/45533 718/1 |

OTHER PUBLICATIONS

Nadav Amit et al.'s, "IOMMU: Strategies for Mitigating the IOTLB Bottleneck", Technion—Israel Institute of Technology; published in "WIOSCA 2010—Sixth Annual Workshop on the Interaction between Operating Systems and Computer Architecture (2010)", pp. 1-12, dated Jun. 21, 2010.
International Search Report and Written Opinion issued in PCT/US2014/062907; 12 pages, Mar. 9, 2015.

(Continued)

*Primary Examiner* — Tammara Peyton
(74) *Attorney, Agent, or Firm* — Baker Botts L.L.P.

(57) ABSTRACT

Methods and systems for I/O acceleration using an I/O accelerator device on a virtualized information handling system include pre-boot configuration of first and second device endpoints that appear as independent devices. After loading a storage virtual appliance that has exclusive access to the second device endpoint, a hypervisor may detect and load drivers for the first device endpoint. The storage virtual appliance may then initiate data transfer I/O operations using the I/O accelerator device. The data transfer operations may be read or write operations to a storage device that the storage virtual appliance provides access to. The I/O accelerator device may use direct memory access (DMA).

20 Claims, 5 Drawing Sheets

(56) References Cited

OTHER PUBLICATIONS

International Search Report and Written Opinion issued in PCT/US2014/062914; 13 pages, Mar. 9, 2015.

Tu et al., "Secure I/O device sharing among virtual machines on multiple hosts", Computer Architecture, ACM, pp. 108-119, Jun. 23, 2013.

Bo et al., "TCNet: cross-node virtual machine communication acceleration", Proceedings of the ACM International Conference on Computing Frontiers, CF '13, 16 pages, May 16, 2013.

Regula, "Using Non-transparent Bridging in PCI Express System 4 Device Identification and Transparent/Non-transparent Mode Control", PLX Technology, Inc.; 32 pages, Jun. 1, 2004.

* cited by examiner

SYSTEM AND METHOD FOR INPUT/OUTPUT ACCELERATION DEVICE HAVING STORAGE VIRTUAL APPLIANCE (SVA) USING ROOT OF PCI-E ENDPOINT

BACKGROUND

1. Field of the Disclosure

This disclosure relates generally to virtualized information handling systems and more particularly to input/output (I/O) acceleration devices and methods for virtualized information handling systems.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Increasingly, information handling systems are deployed in architectures that allow multiple operating systems to run on a single information handling system. Labeled "virtualization," this type of information handling system architecture decouples software from hardware and presents a logical view of physical hardware to software. In a virtualized information handling system, a single physical server may instantiate multiple, independent virtual servers. Server virtualization is enabled primarily by a piece of software (often referred to as a "hypervisor") that provides a software layer between the server hardware and the multiple operating systems, also referred to as guest operating systems (guest OS). The hypervisor software provides a container that presents a logical hardware interface to the guest operating systems. An individual guest OS, along with various applications or other software executing under the guest OS, may be unaware that execution is occurring in a virtualized server environment (as opposed to a dedicated physical server). Such an instance of a guest OS executing under a hypervisor may be referred to as a "virtual machine" or "VM".

Often, virtualized architectures may be employed for numerous reasons, such as, but not limited to: (1) increased hardware resource utilization; (2) cost-effective scalability across a common, standards-based infrastructure; (3) workload portability across multiple servers; (4) streamlining of application development by certifying to a common virtual interface rather than multiple implementations of physical hardware; and (5) encapsulation of complex configurations into a file that is easily replicated and provisioned, among other reasons. As noted above, the information handling system may include one or more operating systems, for example, executing as guest operating systems in respective virtual machines.

An operating system serves many functions, such as controlling access to hardware resources and controlling the execution of application software. Operating systems also provide resources and services to support application software. These resources and services may include data storage, support for at least one file system, a centralized configuration database (such as the registry found in Microsoft Windows operating systems), a directory service, a graphical user interface, a networking stack, device drivers, and device management software. In some instances, services may be provided by other application software running on the information handling system, such as a database server.

The information handling system may include multiple processors connected to various devices, such as Peripheral Component Interconnect ("PCI") devices and PCI express ("PCI-E") devices. The operating system may include one or more drivers configured to facilitate the use of the devices. As mentioned previously, the information handling system may also run one or more virtual machines, each of which may instantiate a guest operating system. Virtual machines may be managed by a virtual machine manager, such as, for example, a hypervisor. Certain virtual machines may be configured for device pass-through, such that the virtual machine may utilize a physical device directly without requiring the intermediate use of operating system drivers.

Conventional virtualized information handling systems may benefit from increased performance of virtual machines. Improved performance may also benefit virtualized systems where multiple virtual machines operate concurrently. Applications executing under a guest OS in a virtual machine may also benefit from higher performance from certain computing resources, such as storage resources.

SUMMARY

In one aspect, a disclosed method is for accelerating data transfer operations on a hypervisor using an accelerator device. Prior to booting the hypervisor on a processor subsystem, the method may include configuring a first Peripheral Component Interconnect Express (PCI-E) endpoint and a second PCI-E endpoint associated with the accelerator device. The accelerator device may be a physical PCI-E device accessible to the processor subsystem. The method may include booting the hypervisor using the processor subsystem and loading a storage virtual appliance (SVA) as a virtual machine on the hypervisor. The hypervisor may assign the second PCI-E endpoint for exclusive access by the SVA. The method may include activating the first PCI-E endpoint by the SVA via the second PCI-E endpoint. Responsive to activating the first PCI-E endpoint, the method may include loading a hypervisor device driver for the first PCI-E endpoint. The first PCI-E endpoint may appear to the hypervisor as a logical hardware adapter accessible via the hypervisor device driver. The method may further include initiating, by the SVA, a data transfer operation between the first PCI-E endpoint and the second PCI-E endpoint.

In certain embodiments, the method includes additional operations performed by the SVA via the second PCI-E endpoint. When the data transfer operation is in progress, the method may include terminating the data transfer operation and deactivating the first PCI-E endpoint. The method may also include programming, on the accelerator device, a first personality profile for the first PCI-E endpoint and a second personality profile for the second PCI-E endpoint. A personality profile may include configuration information for a PCI-E endpoint. The method may further include restarting the second PCI-E endpoint. Responsive to restarting the second PCI-E endpoint, the method may include restarting the first PCI-E endpoint.

Other disclosed aspects include article of manufacture comprising a non-transitory computer-readable medium storing instructions executable by a processor subsystem, and an information handling system comprising a processor having access to a memory subsystem storing instructions executable by the processor subsystem.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
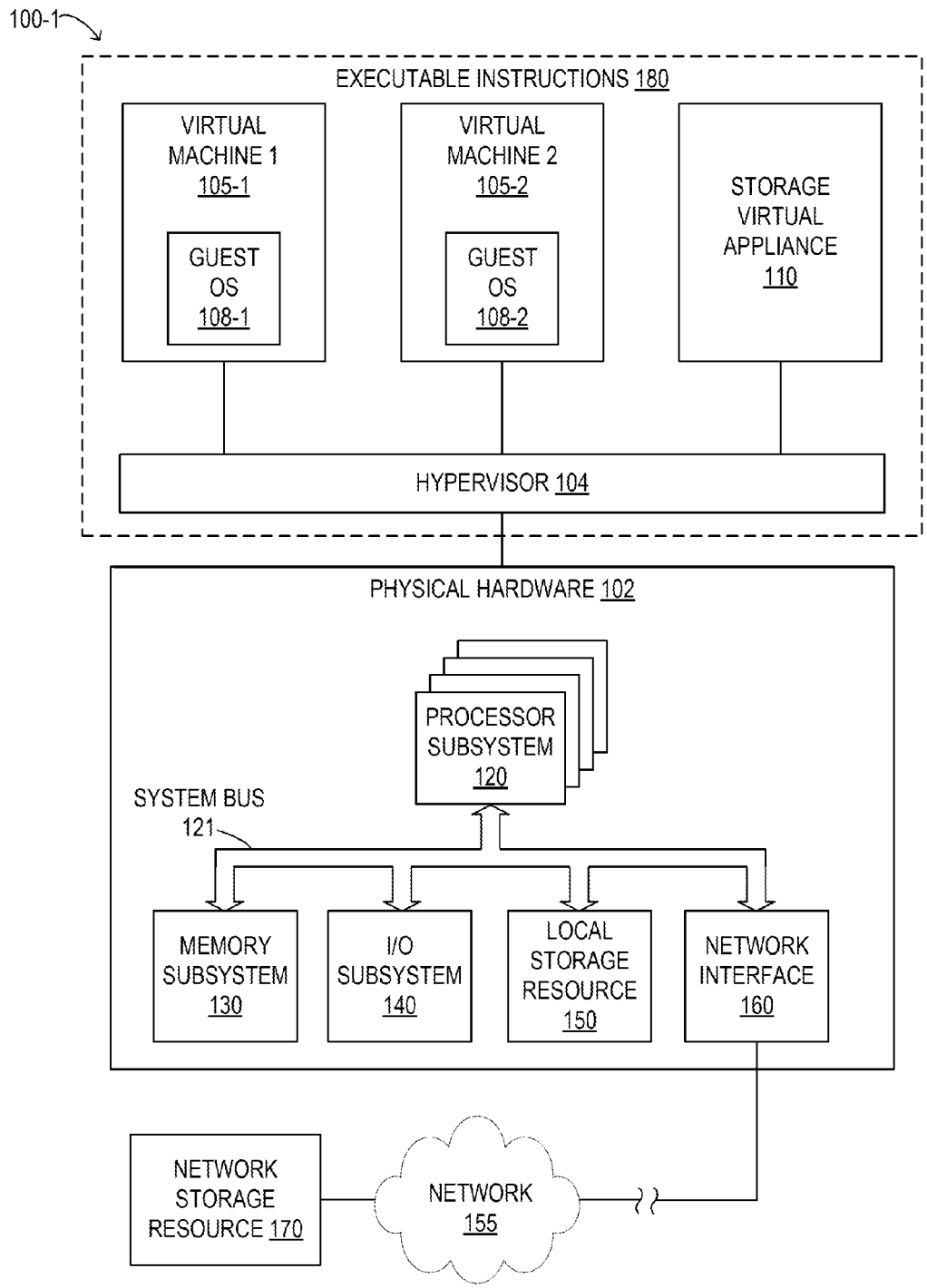
FIG. 1 is a block diagram of selected elements of an embodiment of an information handling system using an I/O accelerator device, as described herein.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, device "12-1" refers to an instance of a device class, which may be referred to collectively as devices "12" and any one of which may be referred to generically as a device "12".

As noted previously, current virtual information handling systems may demand higher performance from computing resources, such as storage resources used by applications executing under guest operating systems. Many virtualized server platforms may desire to provide storage resources to such applications in the form of software executing on the same server where the applications are executing, which may offer certain advantages by bringing data closest to the application. Such software-defined storage may further enable new technologies, such as, but not limited to: (1) flash caches and cache networks using solid state devices (SSD) to cache storage operations and data; (2) virtual storage area networks (SAN); and (3) data tiering by storing data across local storage resources, SAN storage, and network storage, depending on I/O load and access patterns. Server virtualization has been a key enabler of software-defined storage by enabling multiple workloads to run on a single physical machine. Such workloads also benefit by provisioning storage resources closest to the application accessing data stored on the storage resources.

Storage software providing such functionality may interact with multiple lower level device drivers. For example: a layer on top of storage device drivers may provide access to server resident hard drives, flash SSD drives, non-volatile memory devices, and/or SAN storage using various types of interconnect fabric, (i.e., iSCSI, Fibre Channel, Fibre Channel over Ethernet, etc.). In another example, a layer on top of network drivers may provide access to storage software running on other server instances (i.e., access to a cloud). Such driver-based implementations have been challenging from the perspective of supporting multiple hypervisors and delivering adequate performance. Certain hypervisors in use today may not support third-party development of drivers, which may preclude an architecture based on optimized filter drivers in the hypervisor kernel. Other hypervisors may have different I/O architectures and device driver models, which may present challenges to developing a unified storage software for various hypervisor platforms.

Another solution is to implement the storage software as a virtual machine with pass-through access to physical storage devices and resources. However, such a solution may face serious performance issues when communicating with applications executing on neighboring virtual machines, due to low data throughput and high latency in the hypervisor driver stack. Thus, even though the underlying storage resources may deliver substantially improved performance, such as flash caches and cache networks, the performance advantages may not be experienced by applications in the guest OS using typical hypervisor driver stacks.

As will be described in further detail, the inventors of the present disclosure have developed novel methods and systems disclosed herein for improving access to storage resources by using an I/O accelerator device programmed by a storage virtual appliance that provides managed access to local and remote storage resources. The I/O accelerator device may utilize direct memory access (DMA) for storage operations to and from a guest OS in a virtual information handling system. Direct memory access involves the transfer of data to/from system memory without significant involvement by a processor subsystem, thereby improving data throughput and reducing a workload of the processor subsystem. As will be described in further detail, the present disclosure is directed to methods and systems for accelerating I/O using the I/O accelerator device. In some embodiments, the I/O acceleration disclosed herein is used to access a storage resource by an application executing under a guest OS in a virtual machine. In other embodiments, the I/O acceleration disclosed herein may be applicable for scenarios where two virtual machines, two software modules, or different drivers running in an operating system need to send messages or data to each other, but are restricted by virtualized OS performance limitations.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Additionally, the information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1, 2, 3, 4, and 5 wherein like numbers are used to indicate like and corresponding parts.

Referring now to the drawings, FIG. 1 illustrates a block diagram depicting selected elements of an embodiment of system 100-1 for using an input/output (I/O) acceleration device for virtualized information handling systems, in accordance with the present disclosure. As depicted in FIG. 1, system 100-1 represents an information handling system comprising physical hardware 102, executable instructions 180 (including hypervisor 104, one or more virtual machines 105, and storage virtual appliance 110). Also shown with system 100-1 are external or remote elements, namely, network 155 and network storage resource 170.

As shown in FIG. 1, components of physical hardware 102 may include, but are not limited to, processor subsystem 120, which may comprise one or more processors, and system bus 121 that communicatively couples various system components to processor subsystem 120 including, for example, a memory subsystem 130, an I/O subsystem 140, local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 is a suitable system, apparatus, or device operable to serve as an interface between information handling system 100-1 and a network 155. Network interface 160 enables information handling system 100-1 to communicate over network 155 using a suitable transmission protocol or standard, including, but not limited to, transmission protocols or standards enumerated below with respect to the discussion of network 155. In some embodiments, network interface 160 is communicatively coupled via network 155 to network storage resource 170. Network 155 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data or messages (generally referred to as data). Network 155 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 155 and its various components may be implemented using hardware, software, or any combination thereof.

As depicted in FIG. 1, processor subsystem 120 comprises a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and execute program instructions or process data stored locally (e.g., in memory subsystem 130 or another component of physical hardware 102). In the same or alternative embodiments, processor subsystem 120 may interpret and execute program instructions or process data stored remotely (e.g., in network storage resource 170). In particular, processor subsystem 120 may represent a multi-processor configuration that includes at least a first processor and a second processor (see also FIG. 2).

Also in FIG. 1, memory subsystem 130 comprises a system, device, or apparatus operable to retain and retrieve program instructions and data for a period of time (e.g., computer-readable media). Memory subsystem 130 may comprise random access memory (RAM), electrically erasable programmable read-only memory (EEPROM), a PCM-CIA card, flash memory, magnetic storage, opto-magnetic storage, or a suitable selection or array of volatile or non-volatile memory that retains data after power to an associated information handling system, such as system 100-1, is powered down. Local storage resource 150 comprises computer-readable media (e.g., hard disk drive, floppy disk drive, CD-ROM, and/or other type of rotating storage media, flash memory, EEPROM, and/or another type of solid state storage media) and is generally operable to store instructions and data. Likewise, network storage resource 170 comprises computer-readable media (e.g., hard disk drive, floppy disk drive, CD-ROM, or other type of rotating storage media, flash memory, EEPROM, or other type of solid state storage media) and may be generally operable to store instructions and data. In system 100-1, I/O subsystem 140 comprises a system, device, or apparatus generally operable to receive and transmit data to or from or within system 100-1. I/O subsystem 140 may represent, for example, any one or more of a variety of communication interfaces, graphics interfaces, video interfaces, user input interfaces, and peripheral interfaces. In particular, I/O subsystem 140 may include an I/O accelerator device (see also FIG. 2) for accelerating data transfers between storage virtual appliance 110 and guest OS 108, as described herein.

In FIG. 1, hypervisor 104 comprises software (i.e., executable code or instructions) and firmware generally operable to allow multiple operating systems to run on a single information handling system at the same time. This operability is generally allowed via virtualization, a technique for hiding the physical characteristics of information handling system resources from the way in which other systems, applications, or end users interact with those resources. Hypervisor 104 may be one of a variety of proprietary and/or commercially available virtualization platforms, including, but not limited to, IBM's Z/VM, XEN, ORACLE VM, VMWARE's ESX SERVER, L4 MICROKERNEL, TRANGO, MICROSOFT's HYPER-V, SUN's LOGICAL DOMAINS, HITACHI's VIRTAGE, KVM, VMWARE SERVER, VMWARE WORKSTATION, VMWARE FUSION, QEMU, MICROSOFT's VIRTUAL PC and VIRTUAL SERVER, INNOTEK's VIRTUALBOX, and SWSOFT's PARALLELS WORKSTATION and PARALLELS DESKTOP. In one embodiment, hypervisor 104 may comprise a specially designed operating system (OS) with native virtualization capabilities. In another embodiment, hypervisor 104 may comprise a standard OS with an incorporated virtualization component for performing virtualization. In another embodiment, hypervisor 104 may comprise a standard OS running alongside a separate virtualization application. In this embodiment, the virtualization application of hypervisor 104 may be an application running above the OS and interacting with physical hardware 102 only through the OS. Alternatively, the virtualization application of hypervisor 104 may, on some levels, interact indirectly with physical hardware 102 via the OS, and, on other levels, interact directly with physical hardware 102 (e.g., similar to the way the OS interacts directly with physical hardware 102, and as firmware running on physical hardware 102), also referred to as device pass-through. By using device pass-through, the virtual machine may utilize a physical device directly without the intermediate use of operating system drivers. As a further alternative, the virtualization application of hypervisor 104 may, on various levels, interact directly with physical hardware 102 (e.g., similar to the way the OS interacts directly with physical hardware 102, and as firmware running on physical hardware 102) without utilizing the OS, although still interacting with the OS to coordinate use of physical hardware 102.

As shown in FIG. 1, virtual machine 1 105-1 represents a host for guest OS 108-1, while virtual machine 2 105-2 represents a host for guest OS 108-2. To allow multiple operating systems to be executed on system 100-1 at the same time, hypervisor 104 may virtualize certain hardware resources of physical hardware 102 and present virtualized computer hardware representations to each of virtual machines 105. In other words, hypervisor 104 may assign to each of virtual machines 105, for example, one or more processors from processor subsystem 120, one or more regions of memory in memory subsystem 130, one or more components of I/O subsystem 140, etc. The virtualized hardware representation presented to each of virtual machines 105 may comprise a mutually exclusive (i.e., disjoint or non-overlapping) set of hardware resources per virtual machine 105 (e.g., no hardware resources are shared between virtual machines 105). In other embodiments, the virtualized hardware representation may comprise an overlapping set of hardware resources per virtual machine 105 (e.g., one or more hardware resources are shared by two or more virtual machines 105).

In one embodiment, hypervisor 104 may assign hardware resources of physical hardware 102 statically, such that certain hardware resources are assigned to certain virtual machines, and this assignment does not vary over time. Additionally or alternatively, hypervisor 104 may assign hardware resources of physical hardware 102 dynamically, such that the assignment of hardware resources to virtual machines varies over time, for example, in accordance with the specific needs of the applications running on the individual virtual machines. Additionally or alternatively, hypervisor 104 may keep track of the hardware-resource-to-virtual-machine mapping, such that hypervisor 104 is able to determine the virtual machines to which a given hardware resource of physical hardware 102 has been assigned.

In FIG. 1, each of virtual machines 105 may respectively include an instance of guest operating system (guest OS) 108, along with any applications or other software running on guest OS 108. Each guest OS 108 may represent an OS compatible with and supported by hypervisor 104, even when guest OS 108 is incompatible to a certain extent with physical hardware 102, which is virtualized by hypervisor 104. In addition, each guest OS 108 may be a separate instance of the same operating system or an instance of a different operating system. For example, in one embodiment, each guest OS 108 may comprise a LINUX OS. As another example, guest OS 108-1 may comprise a LINUX OS, guest OS 108-1 may comprise a MICROSOFT WINDOWS OS, and while another guest OS on another virtual machine (not shown) may comprise a VXWORKS OS. Although system 100-1 is depicted as having two virtual machines 105-1, 105-2, and storage virtual appliance 110, it will be understood that, in particular embodiments, different numbers of virtual machines 105 may be executing on system 100-1 at any given time.

In FIG. 1, storage virtual appliance 110 may represent storage software executing on hypervisor 104. Although storage virtual appliance 110 may be implemented as a virtual machine, and may execute in a similar environment and address space as described above with respect to virtual machines 105, storage virtual appliance 110 may be dedicated to providing access to storage resources to instances of guest OS 108. Thus storage virtual appliance 110 may not itself be a host for a guest OS that is provided as a resource to users, but may be an embedded feature of information handling system 100. It will be understood, however, that storage virtual appliance 110 may include an embedded virtualized OS (not shown) similar to various implementations of guest OS 108 described previously herein. In particular, storage virtual appliance 110 may enjoy pass-through device access to various devices and interfaces for accessing storage resources (local and/or remote). Additionally, storage virtual appliance 110 is enabled to provide logical communication connections between desired storage resources and guest OS 108 using the I/O accelerator device included in I/O subsystem 140 for very high data throughput rates and very low latency transfer operations, as described herein.

In operation of system 100 shown in FIG. 1, hypervisor 104 of information handling system 100 may virtualize the hardware resources of physical hardware 102 and present virtualized computer hardware representations to each of virtual machines 105. Each guest OS 108 of virtual machines 105 may then begin to operate and run applications and/or other software. While operating, each guest OS 108 may utilize one or more hardware resources of physical hardware 102 assigned to the respective virtual machine by hypervisor 104. Each guest OS 108 and/or application executing under guest OS 108 may be presented with storage resources that are managed by storage virtual appliance 110. In other words, storage virtual appliance 110 may be enabled to mount and partition various combinations of physical storage resources, including local storage resources and remote storage resources, and present these physical storage resources as desired logical storage devices for access by guest OS 108. In particular, storage virtual appliance 110 is enabled to use the I/O accelerator device, which is a PCI-E device represented by I/O subsystem 140 in FIG. 1, for access to storage resources by applications executing under guest OS 108 of virtual machine 105. Also, the features of storage virtual appliance 110 described herein may further allow for implementation in a manner that is independent, or largely independent, of any particular implementation of hypervisor 104.

Figure 2:
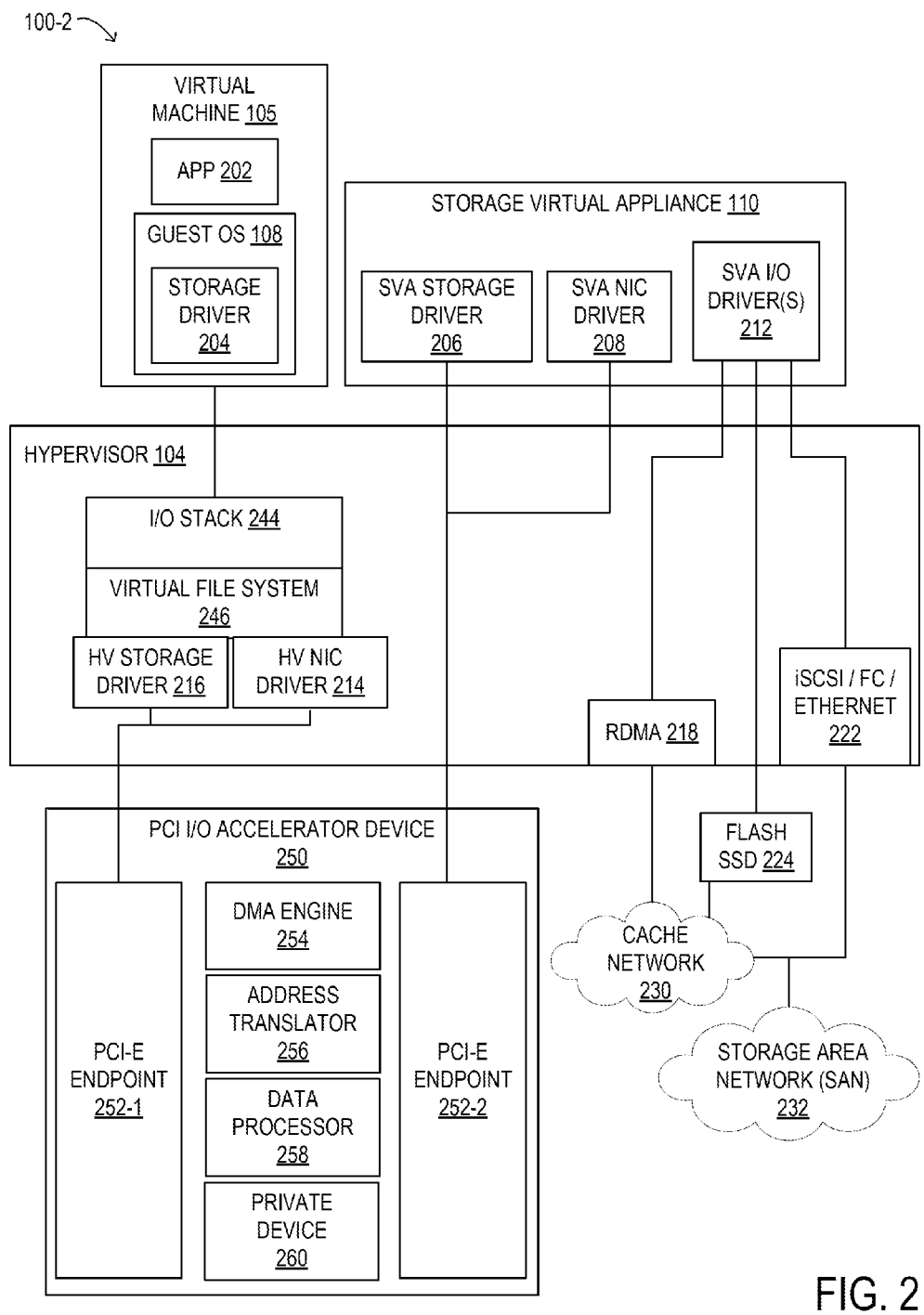
FIG. 2 is a block diagram of selected elements of an embodiment of an information handling system using an I/O accelerator device, as described herein.

Referring now to FIG. 2, a block diagram of selected elements of an embodiment of system 100-2 is illustrated. In FIG. 2, system 100-2 may represent an information handling system that is an embodiment of system 100-1 (see FIG. 1). As shown, system 100-2 includes further details regarding the operation and use of PCI I/O accelerator device 250, while other elements shown in system 100-1 have been omitted from FIG. 2 for descriptive clarity. In FIG. 2, for example, virtual machine 105 and guest OS 108 are shown in singular, though they may represent any number of instances of virtual machine 105 and guest OS 108.

In FIG. 2, virtual machine 105 is shown executing app 202 and guest OS 108 under which storage driver 204 is installed and loaded. Storage driver 204 enables virtual machine 105 to access storage resources via I/O stack 244, virtual file system 246, hypervisor (HV) storage driver 216, and HV network integrated controller (NIC) driver 214, which are loaded into hypervisor 104. I/O stack 244 provides interfaces to VM-facing I/O by hypervisor 104 to interact with storage driver 204 executing on virtual machine 105. Virtual file system 246 is a file system provided by hypervisor 104, for example, for access by guest OS 108.

As shown in FIG. 2, virtual file system 246 interacts with HV storage driver 248 and HV NIC driver 214, to access PCI I/O accelerator device 250. Depending on a configuration (i.e., class code) used with PCI I/O accelerator device 250, PCI-E endpoint 252-1 on PCI I/O accelerator device 250 that is installed at hypervisor 104 may appear as a memory/storage resource (using HV storage driver 248 for block access) or as a network controller (using HV NIC driver 214 for file access) to virtual file system 246 in different embodiments. In particular, PCI I/O accelerator device 250 enables data transfers at high data rates while subjecting processor subsystem 120 with minimal workload, and thus, represents an efficient mechanism for I/O acceleration, as described herein.

Additionally, in the exemplary embodiment of FIG. 2, storage virtual appliance 110 is shown including SVA storage driver 206, SVA NIC driver 208, and SVA I/O drivers 212. As with virtual file system 246, storage virtual appliance 110 may interact with PCI I/O accelerator device 250 using SVA storage driver 206 or SVA NIC driver 208, depending on a configuration of PCI-E Endpoint 252-2 in PCI I/O accelerator device 250. Thus, depending on the configuration, PCI-E endpoint 252-2 may appear as a memory/storage resource (using SVA storage driver 206 for block access) or a network controller (using SVA NIC driver 208 for file access) to storage virtual appliance 110. In various embodiments, storage virtual appliance 110 may enjoy pass-through access to PCI I/O accelerator device end-point 252-2, as described herein.

In FIG. 2, SVA I/O drivers 212 represent 'back-end' drivers that enable storage virtual appliance 100 to access and provide access to various storage resources. As shown, SVA I/O drivers 212 have pass-through access to remote direct memory access (RDMA) 218, iSCSI/Fibre Channel (FC)/Ethernet 222, and flash SSD 224. For example, RDMA 218 or flash SSD 224 or iSCSI/FC/Ethernet 222 may participate in cache network 230, which may be a high performance network for caching storage operations and/or data between a plurality of information handling systems (not shown), such as system 100. As shown, iSCSI/FC/Ethernet 222 may also provide access to storage area network (SAN) 240, which may include various external storage resources, such as network-accessible storage arrays.

In FIG. 2, PCI I/O accelerator device 250 is shown including PCI-E endpoints 252, DMA engine 254, address translator 256, data processor 258, and private device 260. PCI I/O accelerator device 250 may include additional components in various embodiments, such as memory media for buffers or other types of local storage, which are omitted from FIG. 2 for descriptive clarity. As shown, PCI-E endpoint 252-1 is configured to be accessible via a first root port, which enables access by HV storage driver 216 or HV NIC driver 214. PCI-E endpoint 252-2 is configured to be accessible by second root port, which enables access by SVA storage driver 206 or SVA NIC driver 208. Thus, an exemplary embodiment of a PCI I/O accelerator device 250 implemented as a single x16 PCI-E adapter board and plugged into a x16 PCI-E slot of information handling system 100-2 appears as two x8 PCI-E endpoints 252 that are logically addressable as individual PCI-E endpoints via the two root ports in the system root complex. The first and second root ports represent the root complex of a processor (such as processor subsystem 120) or a chipset associated with the processor. The root complex includes an input/output memory management unit (IOMMU) that isolates memory regions used by I/O devices by mapping specific memory regions to I/O devices using system software for exclusive access. The IOMMU may support direct memory access (DMA) using a DMA Remapping Hardware Unit Definition (DRHD). To a host of PCI I/O accelerator device 250, such as hypervisor 104, PCI I/O accelerator device 250 appears as two independent PCI-E devices, namely PCI-E endpoints 252-1 and 252-2. Thus, hypervisor 104 may be unaware of, and may not have access to, local processing and data transfer that occurs via PCI I/O accelerator device 250, including DMA operations performed by PCI I/O accelerator device 250.

Accordingly, in FIG. 2, upon startup of system 100-2, pre-boot software may present PCI-E endpoints 252 as logical devices, of which only PCI-E endpoint 252-2 is visible to hypervisor 104 upon startup. Then, hypervisor 104 is configured to assign PCI-E endpoint 252-2 for exclusive access by storage virtual appliance 110. Then, storage virtual appliance 110 receives pass-through access to PCI-E endpoint 252-2 from hypervisor 104, through which storage virtual appliance 110 may control operation of PCI I/O accelerator device 250. Then, hypervisor 104 boots and loads storage virtual appliance 110. Upon loading and startup, storage virtual appliance 110 may provide configuration details for both PCI-E endpoints 252, including a class code for a type of PCI device. Then, storage virtual appliance 110 initiates a function level reset of PCI-E endpoint 252-2 to implement the desired configuration. Storage virtual appliance 110 then initiates a function level reset of PCI-E endpoint 252-1, which results in hypervisor 104 recognizing PCI-E endpoint 252-1 as a new device that has been hot-plugged into system 100-2. As a result, hypervisor 104 loads an appropriate driver for PCI-E endpoint 252-1 and I/O operations can proceed. Hypervisor 104 may exclusively access PCI-E endpoint 252-1 for allocating buffers and transmitting or receiving commands from PCI-E endpoint 252-2. However, hypervisor 104 may remain unaware of processing and data transfer operations performed by PCI I/O accelerator device 250, including DMA operations and programmed I/O operations.

Accordingly, in FIG. 2, DMA engine 254 performs DMA programming of the IOMMU and may support scatter-gather or memory-to-memory types of access. Address translator 256 performs address translations for data transfers and may use the IOMMU to resolve addresses from certain memory spaces in system 100-2 (see also FIG. 3). In certain embodiments, address translator 256 may maintain a local address translation cache. Data processor 258 provides general data processing functionality that includes processing of data during data transfer operations. Data processor 258 may include, or have access to, memory included with PCI I/O accelerator device 250. In certain embodiments, PCI I/O accelerator device 250 may include an onboard memory controller and expansion slots to receive local RAM that is used by data processor 258. Operations that are supported by data processor 258 and that may be programmable by storage virtual appliance 110 include encryption, compression, calculations on data (i.e., checksums, etc.), and malicious code detection. Also shown is private device 260, which may represent any of a variety of devices for hidden or private use by storage virtual appliance 110. In other words, because hypervisor 104 is unaware of internal features and actions of PCI I/O accelerator device 250, private device 260 can be used by storage virtual appliance 110 independently of and without knowledge of hypervisor 104. In various embodiments, private device 260 is selected from a memory device, a network interface adapter, a storage adapter, and a storage device. In some embodiments, private device 260 is removable or hot-pluggable, such as a universal serial bus (USB) device.

Figure 3:
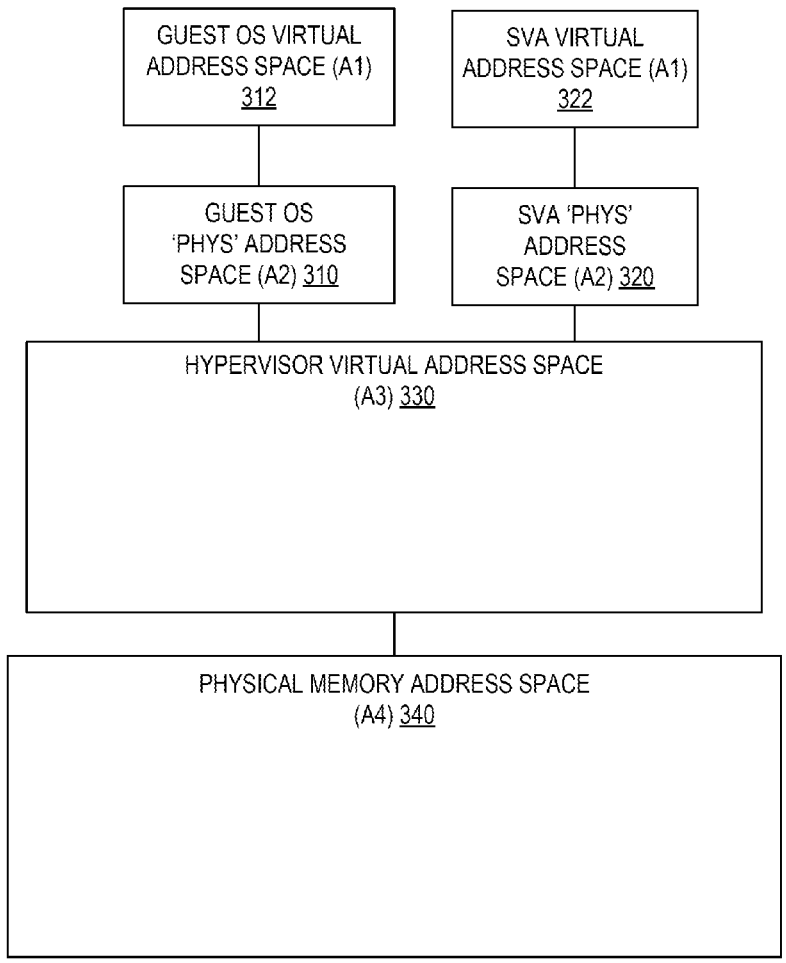
FIG. 3 is a block diagram of selected elements of an embodiment of a memory space using an I/O accelerator device, as described herein.

Referring now to FIG. 3, a block diagram of selected elements of an embodiment of memory space 300 is illustrated. In FIG. 3, memory space 300 depicts various memory addressing spaces, or simply 'address spaces' for various virtualization layers included in information handling system 100 (see FIGS. 1 and 2). The different memory addresses shown in memory space 300 may be used by address translator 256, as described above with respect to FIG. 2.

As shown in FIG. 3, memory space 300 includes physical memory address space (A4) 340 for addressing physical memory. For example, in information handling system 100, processor subsystem 120 may access memory subsystem 130, which may provide physical memory address space (A4) 340. Since hypervisor 104 executes on physical computing resources, hypervisor virtual address space (A3) 330 represents a virtual address space that is based on physical memory address space (A4) 340. A virtual address space enables addressing of larger memory spaces with a limited amount of physical memory and may rely upon an external storage resource (not shown in FIG. 3) for offloading or caching operations. Hypervisor virtual address space (A3) 330 represents an internal address space used by hypervisor 104. Hypervisor 104 may further generate so-called 'physical' address spaces within hypervisor virtual address space (A3) 330 and present these 'physical' address space to virtual machines 105 and storage virtual appliance 110 for virtualized execution. From the perspective of virtual machines 105 and storage virtual appliance 110, the 'physical' address space provided by hypervisor 104 may appear as a real physical memory space. As shown, guest OS 'phys' address space (A2) 310 and SVA 'phys' address space (A2) 320 represent the 'physical' address space provided by hypervisor 104 to guest OS 108 and storage virtual appliance 110, respectively. Finally, guest OS virtual address space (A1) 312 represents a virtual address space that guest OS 108 implements using guest OS 'phys' address space (A2) 310. SVA virtual address space (A1) 322 represents a virtual address space that storage virtual appliance 110 implements using SVA 'phys' address space (A2) 320.

It is noted that the labels A1, A2, A3, and A4 refer to specific hierarchical levels of real or virtualized memory spaces, as described above, with respect to information handling system 100. For descriptive clarity, the labels A1, A2, A3, and A4 are referred to in describing operation of PCI I/O accelerator device 250 in further detail with reference to FIGS. 1-3.

In operation, PCI I/O accelerator device 250 supports various data transfer operations including I/O protocol read and write operations. Specifically, app 202 may issue a read operation from a file (or a portion thereof) that storage virtual appliance 110 provides access to via SVA I/O drivers 212. App 202 may issue a write operation to a file that storage virtual appliance 110 provides access to via SVA I/O drivers 212. PCI I/O accelerator device 250 may accelerate processing of read and write operations by hypervisor 104, as compared to other conventional methods.

In an exemplary embodiment of an I/O protocol read operation, app 202 issues a read request for a file in address space A1 for virtual machine 105. Storage driver 204 may translate memory addresses associated with the read request into address space A2 for virtual machine 105 Then, virtual file system 246 (or one of HV storage driver 216, HV NIC driver 214) may translate the memory addresses into address space A4 for hypervisor 104 (referred to as 'A4 (HV)') and store the A4 memory addresses in a protocol I/O command list before sending a doorbell to PCI-E endpoint 252-1. Protocol I/O commands may be read or write commands. The doorbell received on PCI-E endpoint 252-1 is sent to storage virtual appliance 110 by PCI-E endpoint 252-2 as a translated memory write using address translator 256 in address space A2 (SVA). SVA storage driver 206 notes the doorbell and then reads the I/O command list in address space A4 (HV) by sending results of PCI-E read operations to PCI-E endpoint 252-2. Address translator 256 translates the PCI-E read operations directed to PCI-E endpoint 252-2 into PCI-E read operations directed to buffers in address space A4 (HV) that contain the protocol I/O command list. SVA storage driver 206 now has read the command list containing the addresses in address space A4 (HV). Because the addresses of the requested data are known to SVA storage driver 206 (or SVA NIC driver 208) for I/O protocol read operations, the driver programs the address of the data in address space A2 (SVA) and the address of the buffer allocated by hypervisor 104 in address space A4 (HV) into DMA engine 254. DMA engine 254 may request a translation for addresses in address space A2 (SVA) to address space A4 (HV) from IOMMU. In certain embodiments, DMA engine 254 may cache these addresses for performance purposes. DMA engine 254 performs reads from address space A2 (SVA) and writes to address space A4 (HV). Upon completion DMA engine 254 sends interrupts (or another type of signal) to the HV driver (HV storage driver 216 or HV NIC driver 214) and to the SVA driver (SVA storage driver 206 or SVA NIC driver 208). The HV driver may now write the read data into buffers that return the response of the file I/O read in virtual file system 246. This buffer data is further propagated according to the I/O read request up through storage driver 204, guest OS 108, and app 202.

For a write operation, a similar process as described above for the read operation may be performed with the exception that DMA engine 254 is programmed to perform a data transfer from address space A4 (HV) to buffers allocated in address space A2 (SVA).

Figure 4:
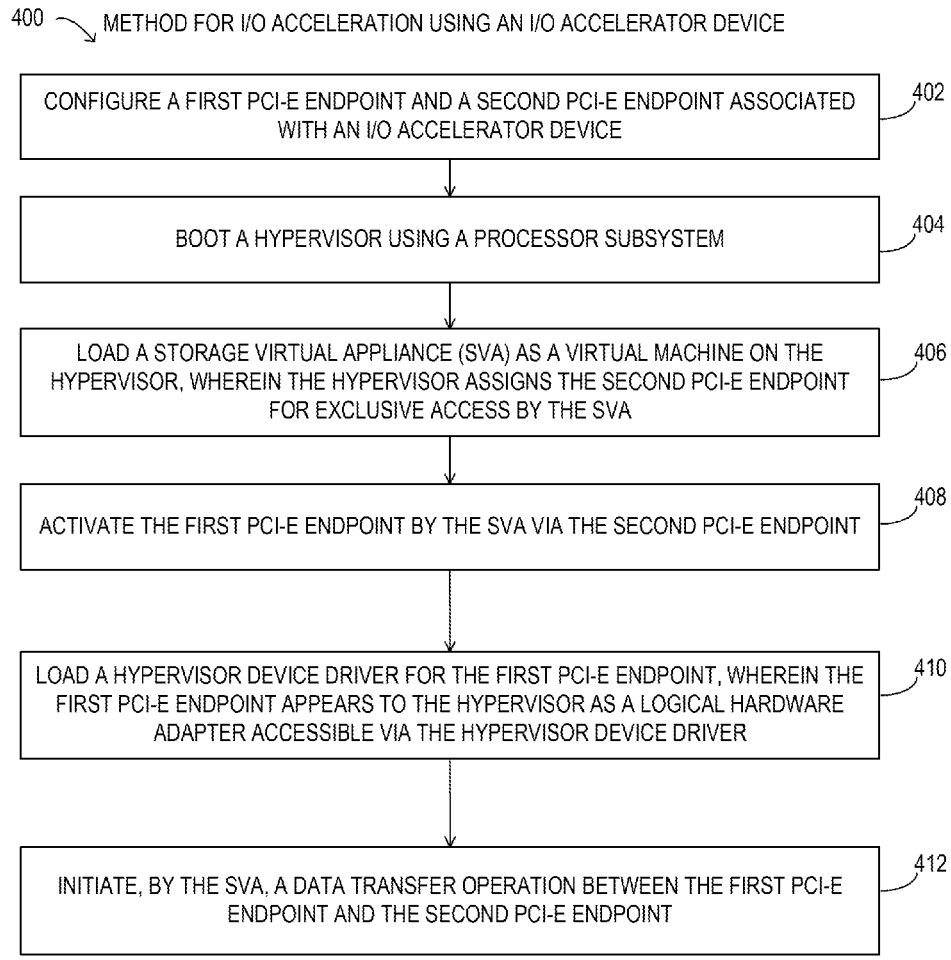
FIG. 4 is flowchart depicting selected elements of an embodiment of a method for I/O acceleration using an I/O accelerator device, as described herein.

Referring now to FIG. 4, a block diagram of selected elements of an embodiment of method 400 for I/O acceleration using an I/O accelerator device in a virtualized information handling system, as described herein, is depicted in flowchart form. Method 400 may be performed using information handling system 100 (see FIGS. 1 and 2). It is noted that certain operations described in method 400 may be optional or may be rearranged in different embodiments.

In FIG. 4, method 400 may begin by configuring (operation 402) a first PCI-E endpoint and a second PCI-E endpoint associated with an I/O accelerator device. The configuration in operation 402 may represent pre-boot configuration. A hypervisor is booted (operation 404) using a processor subsystem. A storage virtual appliance (SVA) may be loaded (operation 406) as a virtual machine on the hypervisor, wherein the hypervisor assigns the second PCI-E endpoint for exclusive access by the SVA. The hypervisor may act according to a pre-boot configuration performed in operation 402. The first PCI-E endpoint may be activated (operation 408) by the SVA via the second PCI-E endpoint. Next, a hypervisor device driver may be loaded (operation 410) for the first PCI-E endpoint, wherein the first PCI-E endpoint appears to the hypervisor as a logical hardware adapter accessible via the hypervisor device driver. The hypervisor device driver may be HV storage driver 216 or HV NIC driver 214. A data transfer operation may be initiated (operation 412) by the SVA between the first PCI-E endpoint and the second PCI-E endpoint.

Figure 5:
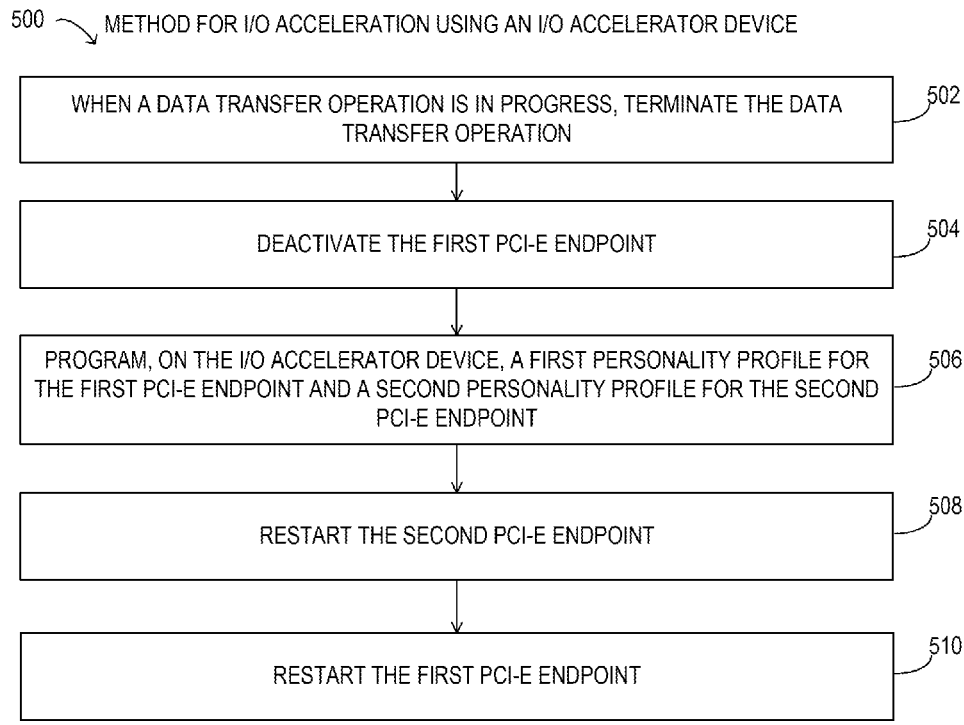
FIG. 5 is flowchart depicting selected elements of an embodiment of a method for I/O acceleration using an I/O accelerator device, as described herein.

Referring now to FIG. 5, a block diagram of selected elements of an embodiment of method 500 for I/O acceleration using an I/O accelerator device in a virtualized information handling system, as described herein, is depicted in flowchart form. Method 500 may be performed using information handling system 100 (see FIGS. 1 and 2). It is noted that certain operations described in method 500 may be optional or may be rearranged in different embodiments. Method 500 may be performed after method 400 (see FIG. 4).

In FIG. 5, method 500 may begin when a data transfer operation is progress by terminating (operation 502) the data transfer operation. The first PCI-E endpoint may be deactivated (operation 504). On the I/O accelerator device, a first personality profile for the first PCI-E endpoint and a second personality profile for the second PCI-E endpoint may be programmed (operation 506). A personality profile may include various settings and attributes for a PCI-E endpoint and may cause the PCI-E endpoint to behave (or to appear) as a specific type of device. Then, the second PCI-E endpoint may be restarted (operation 508). The first PCI-E endpoint may be restarted (operation 510). Responsive to operation 510, the hypervisor may detect and load a driver for the first PCI-E endpoint.

As described in detail herein, disclosed methods and systems for I/O acceleration using an I/O accelerator device on a virtualized information handling system include pre-boot configuration of first and second device endpoints that appear as independent devices. After loading a storage virtual appliance that has exclusive access to the second device endpoint, a hypervisor may detect and load drivers for the first device endpoint. The storage virtual appliance may then initiate data transfer I/O operations using the I/O accelerator device. The data transfer operations may be read or write operations to a storage device that the storage virtual appliance provides access to. The I/O accelerator device may use direct memory access (DMA).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for accelerating data transfer operations, the method comprising:
    prior to booting a hypervisor on a processor subsystem having a root complex, configuring a first Peripheral Component Interconnect Express (PCI-E) endpoint and a second PCI-E endpoint associated with an accelerator device, wherein the accelerator device is a physical PCI-E device exclusively accessible to the processor subsystem;
    booting the hypervisor using the processor subsystem;
    loading a storage virtual appliance (SVA) as a virtual machine on the hypervisor, wherein the hypervisor assigns the second PCI-E endpoint for exclusive access by the SVA using a second root port of the root complex;
    activating the first PCI-E endpoint by the SVA using a first root port of the root complex via the second PCI-E endpoint;
    responsive to activating the first PCI-E endpoint, loading a hypervisor device driver for the first PCI-E endpoint, wherein the first PCI-E endpoint appears to the hypervisor as a logical hardware adapter accessible via the hypervisor device driver; and
    initiating, by the SVA, a data transfer operation between the first PCI-E endpoint and the second PCI-E endpoint.

2. The method of claim 1, wherein the data transfer operation is between a first virtual machine and a second virtual machine executing on the hypervisor.

3. The method of claim 2, wherein the first PCI-E endpoint is associated with a first address space for the first virtual machine and the second PCI-E endpoint is associated with a second address space for the second virtual machine, wherein the accelerator device performs address translation transactions between the first address space and a physical memory address space and between the second address space and the physical memory address space.

4. The method of claim 3, wherein the accelerator device performs address translation caching for the address translation transactions, wherein the address translation caching is performed before the data transfer operation is initiated.

5. The method of claim 1, wherein the data transfer operation includes a direct memory access (DMA) operation performed by the accelerator device, and wherein initiating the data transfer operation includes:
    causing, by the SVA, DMA parameters for the DMA operation to be sent the accelerator device.

6. The method of claim 1, wherein the data transfer operation includes a programmed input/output (PIO) operation performed by the accelerator device.

7. The method of claim 1, further comprising, by the SVA via the second PCI-E endpoint:
    when the data transfer operation is in progress, terminating the data transfer operation;

deactivating the first PCI-E endpoint;
programming, on the accelerator device, a first personality profile for the first PCI-E endpoint and a second personality profile for the second PCI-E endpoint, wherein a personality profile includes configuration information for a PCI-E endpoint;
restarting the second PCI-E endpoint; and
responsive to restarting the second PCI-E endpoint, restarting the first PCI-E endpoint.

8. The method of claim 1, wherein the data transfer operation includes data processing operations performed by the accelerator device, wherein the data processing operations are selected from:
encryption;
compression;
checksum; and
malicious code detection.

9. The method of claim 1, wherein the SVA uses the second PCI-E endpoint to access a private device on the accelerator device, the private device selected from:
a memory device;
a network interface adapter;
a storage adapter; and
a storage device.

10. The method of claim 2, wherein the SVA programs the accelerator device to generate interrupts associated with the data transfer operation.

11. An information handling system, comprising:
an accelerator device that is a physical Peripheral Component Interconnect Express (PCI-E) device;
a processor subsystem having access to a memory subsystem and having exclusive access to the accelerator device, wherein the memory subsystem stores instructions executable by the processor subsystem for accelerating data transfer operations on a hypervisor using the accelerator device, the instructions, when executed by the processor subsystem, cause the processor subsystem to:
prior to executing instructions to boot the hypervisor, configure a first PCI-E endpoint and a second PCI-E endpoint associated with the accelerator device;
boot the hypervisor using the processor subsystem;
load a storage virtual appliance (SVA) as a virtual machine on the hypervisor, wherein the hypervisor assigns the second PCI-E endpoint for exclusive access by the SVA;
activate the first PCI-E endpoint by the SVA via the second PCI-E endpoint;
responsive to the instructions to activate the first PCI-E endpoint, load a hypervisor device driver for the first PCI-E endpoint, wherein the first PCI-E endpoint appears to the hypervisor as a logical hardware adapter accessible via the hypervisor device driver; and
initiate, by the SVA, a data transfer operation between the first PCI-E endpoint and the second PCI-E endpoint.

12. The information handling system of claim 11, wherein the data transfer operation is between a first virtual machine and a second virtual machine executing on the hypervisor.

13. The information handling system of claim 12, wherein the first PCI-E endpoint is associated with a first address space for the first virtual machine and the second PCI-E endpoint is associated with a second address space for the second virtual machine, wherein the accelerator device performs address translation transactions between the first address space and a physical memory address space and between the second address space and the physical memory address space.

14. The information handling system of claim 13, wherein the accelerator device performs address translation caching for the address translation transactions, wherein the address translation caching is performed before the data transfer operation is initiated.

15. The information handling system of claim 11, wherein the data transfer operation includes a direct memory access (DMA) operation performed by the accelerator device, and wherein the instructions to initiate the data transfer operation include instructions to:
cause, by the SVA, DMA parameters for the DMA operation to be sent the accelerator device.

16. The information handling system of claim 11, wherein the data transfer operation includes a programmed input/output (PIO) operation performed by the accelerator device.

17. The information handling system of claim 11, further comprising instructions executed by the SVA via the second PCI-E endpoint to:
when the data transfer operation is in progress, terminate the data transfer operation;
deactivate the first PCI-E endpoint;
program, on the accelerator device, a first personality profile for the first PCI-E endpoint and a second personality profile for the second PCI-E endpoint, wherein a personality profile includes configuration information for a PCI-E endpoint;
restart the second PCI-E endpoint; and
responsive to the instructions to restart the second PCI-E endpoint, restart the first PCI-E endpoint.

18. The information handling system of claim 11, wherein the data transfer operation includes data processing operations performed by the accelerator device, wherein the data processing operations are selected from:
encryption;
compression;
checksum; and
malicious code detection.

19. The information handling system of claim 11, wherein the SVA uses the second PCI-E endpoint to access a private device on the accelerator device, the private device selected from:
a memory device;
a network interface adapter;
a storage adapter; and
a storage device.

20. The information handling system of claim 12, wherein the SVA programs the accelerator device to generate interrupts associated with the data transfer operation.

* * * * *